March 17, 1953  K. HOLSTEBRO ET AL  2,631,746
APPARATUS FOR REMOVING ARTICLES FROM CASES
Filed May 25, 1950  8 Sheets-Sheet 1

INVENTORS
Kaye Holstebro
Edgar Ardell
BY
Pennie, Edmonds, Morton and Barrows
ATTORNEYS

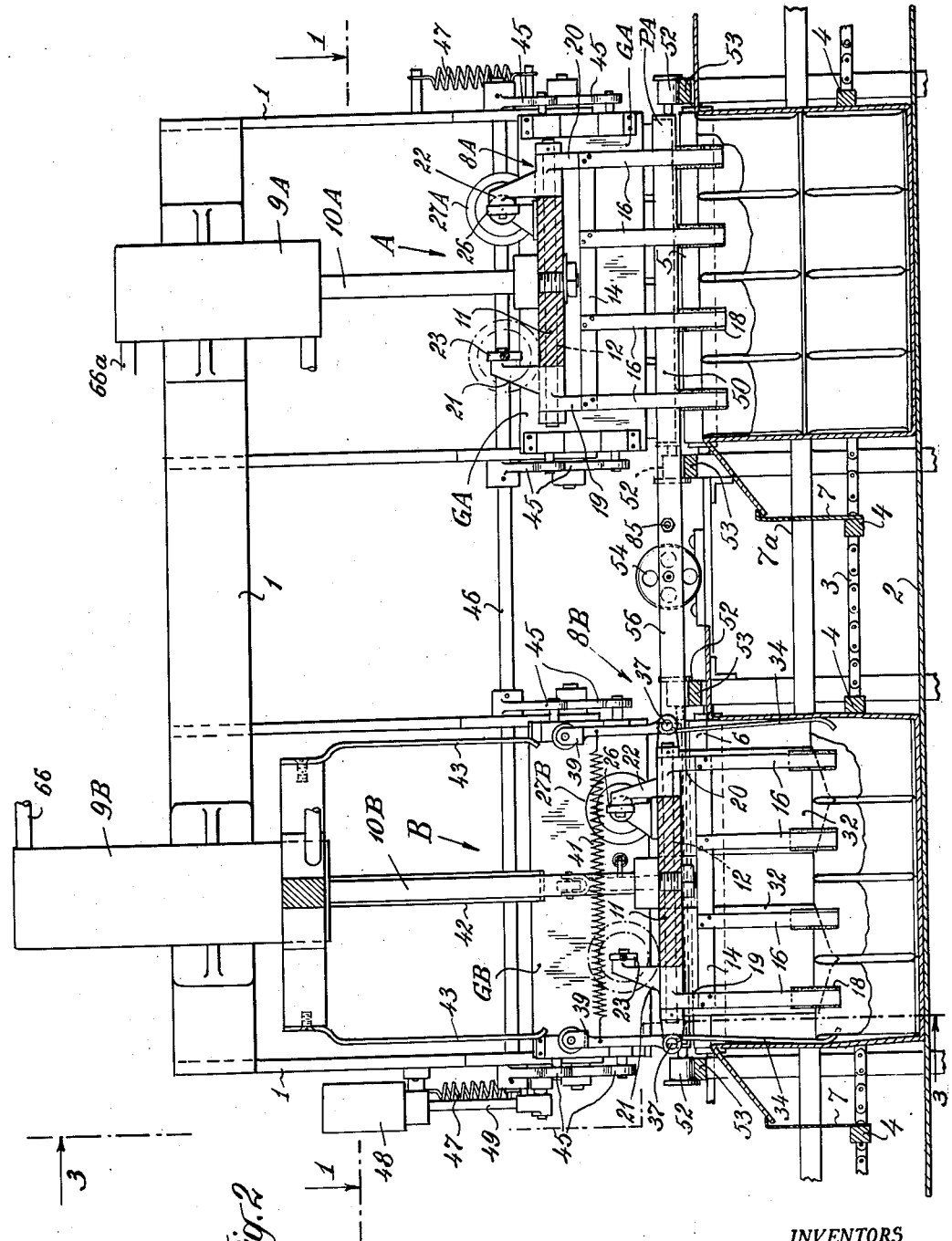

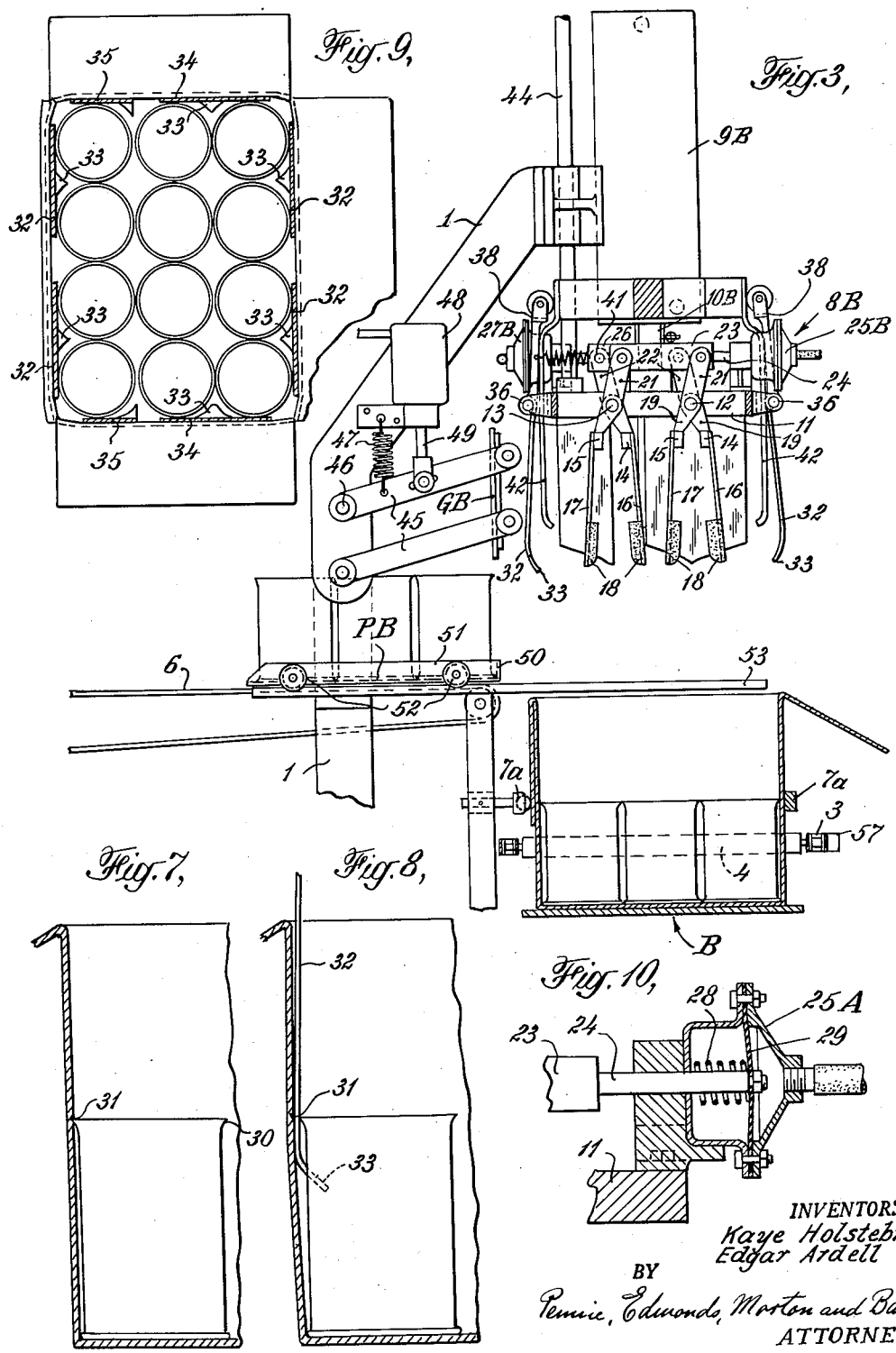

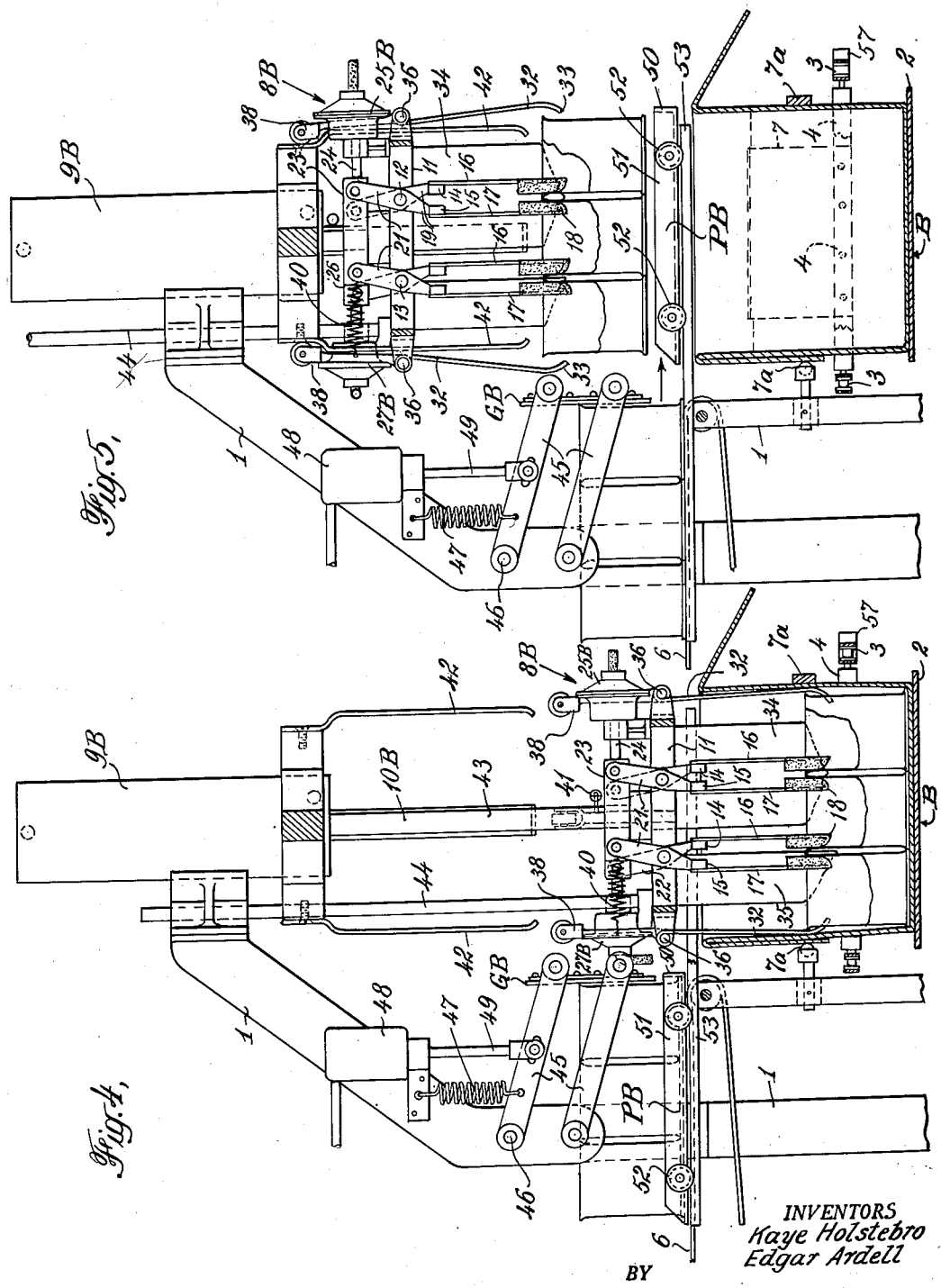

Fig. 6

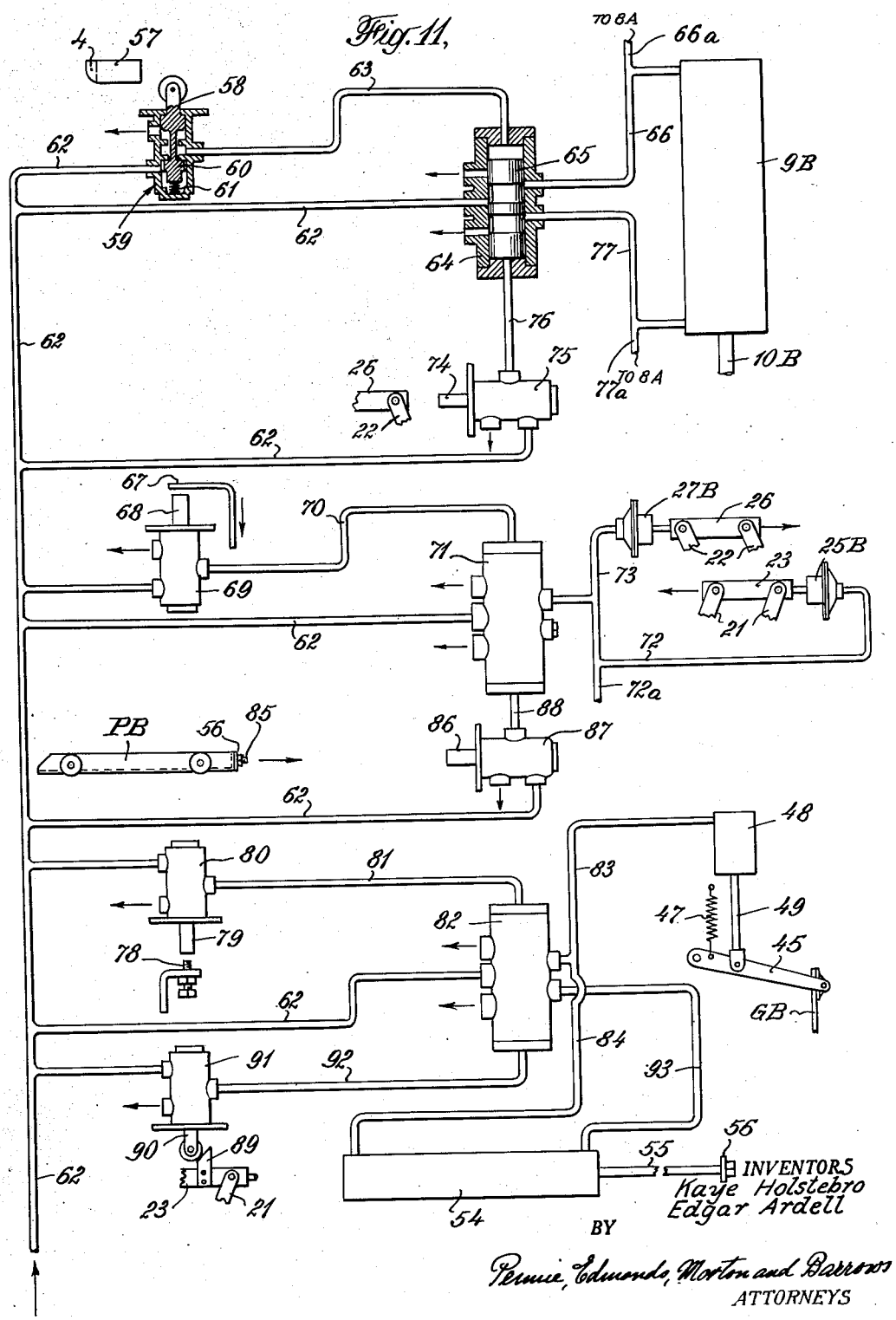

March 17, 1953 K. HOLSTEBRO ET AL 2,631,746
APPARATUS FOR REMOVING ARTICLES FROM CASES
Filed May 25, 1950 8 Sheets-Sheet 7

INVENTORS
Kaye Holstebro
Edgar Ardell
BY Rinne, Edmonds,
Morton and Barrows
ATTORNEYS March 17, 1953 K. HOLSTEBRO ET AL 2,631,746
APPARATUS FOR REMOVING ARTICLES FROM CASES
Filed May 25, 1950 8 Sheets-Sheet 8
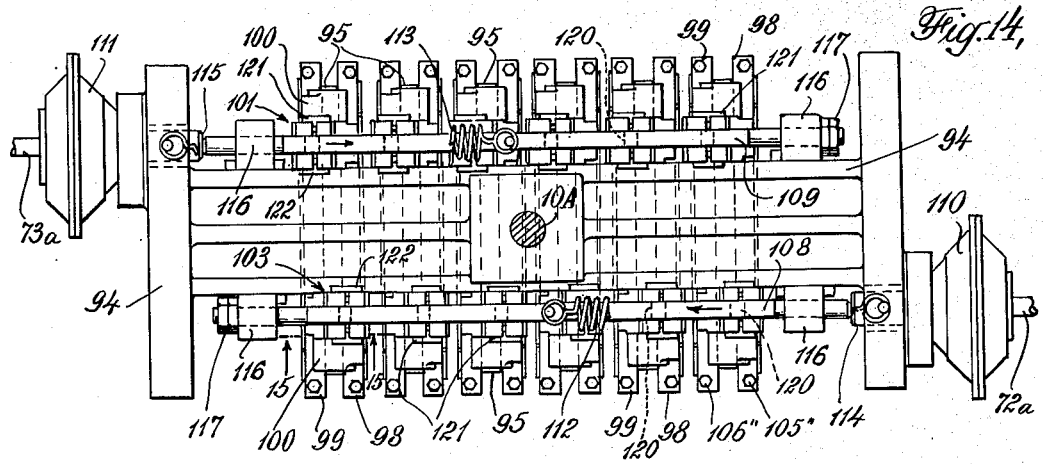
Fig. 14,
Fig. 18,
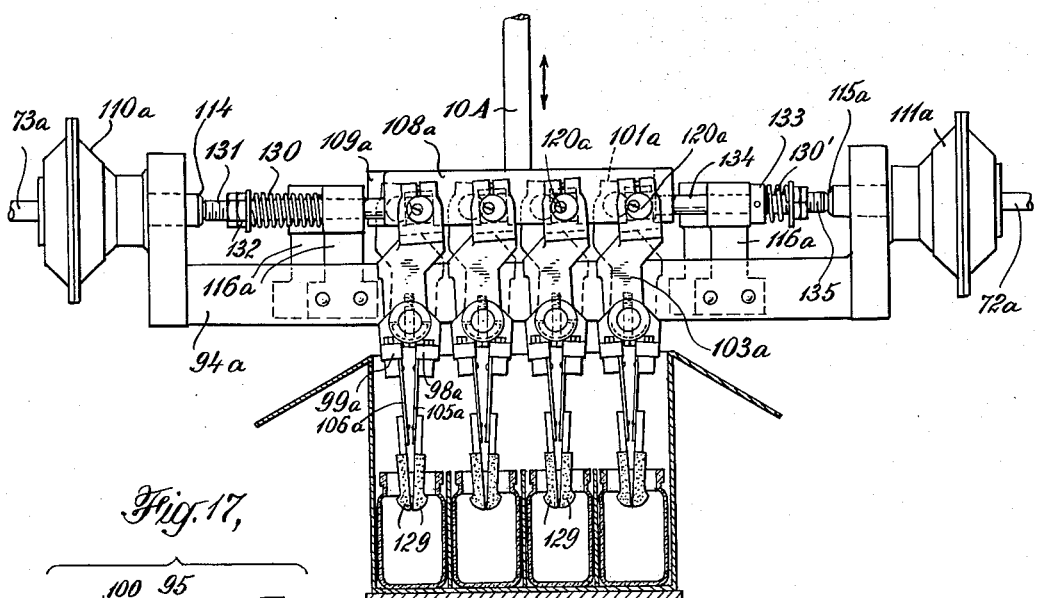
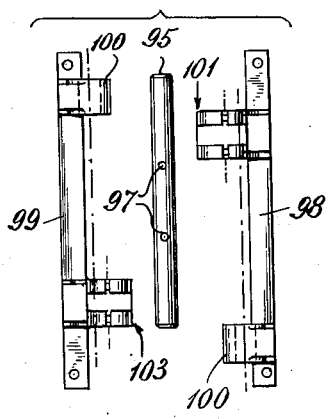
Fig. 17,
INVENTORS
Kaye Holstebro
Edgar Ardell
BY
Pennie, Edmonds, Morton and Barrows
ATTORNEYS Patented Mar. 17, 1953

2,631,746

UNITED STATES PATENT OFFICE 2,631,746

APPARATUS FOR REMOVING ARTICLES FROM CASES

Kaye Holstebro, Gildersleeve, and Edgar Ardell, Middletown, Conn., assignors to Emhart Manufacturing Company, a corporation of Delaware Application May 25, 1950, Serial No. 169,816

8 Claims. (Cl. 214—309)

This invention relates to unloading apparatus, that is, to apparatus for removing articles from shipping, or other cases or trays, and its purpose is to provide certain improvements in the construction and operation of such apparatus.

In the food and beverage industries it is customary for the empty containers, such as metal cans, glass jars and the like to be sent to the food processor or beverage plant in the same shipping cases in which the food or beverage product is to be ultimately shipped to the distributor or consumer. Empty unfilled cans frequently have the bottoms rolled and beaded to the can bodies, while the tops of the bodies are open and flared to receive the lids. Such flared portion is larger in diameter than the bead on the bottom of the can, and its edge is sharp and where the shipping case contains two tiers or layers of such empty cans, these sharp, flared edges, particularly of the lower tier, have a tendency to cut into or dent the inner walls of the shipping case. This condition is especially troublesome in connection with the usual types of shipping cases made of corrugated board, fiber board, and the like.

In removing the cans from the shipping cases by means of mechanical grippers that positively grip the complete lower tire of cans and remove it as a unit, the cutting or denting of the case walls by the flared tops of the cans tends to cause the case to stick to or hang on the tier of cans as it is lifted out and make separation of the case and cans difficult.

Accordingly, one object of the present invention is to provide an unloading apparatus which is constructed and arranged especially for removing empty containers, whether of metal or of glass, or other material, from shipping cases.

Another object of the invention is to provide an unloading apparatus in which a tier of cans having flared tops with sharp edges can be as readily removed from the case as though these flared edges were not present.

Another object of the invention is to provide an unloading apparatus for removing articles from cases which can be readily set up to operate upon articles of various kinds, whether empty containers or filled containers and whether made of metal, glass or other material, thus providing an apparatus which is extremely flexible as to its use.

Another object of the invention is to provide an unloading apparatus which is not expensive in first cost, and in which the cost of servicing is unusually low.

A further object of the invention is to provide a lifting head mechanism for such unloading apparatus having an unusually quick action both in gripping and in releasing the articles, and in which the rate of wear is low and in which no loose joints can develop of a nature to interfere with the effectiveness of article support.

The invention will be disclosed in connection with an unloading apparatus which is intended to remove from shipping cases empty sheet metal cans having flared upper edges which tend to engage and adhere to the walls of the case whenever these edges are positioned below the top of the case. Such an apparatus is shown by way of example in the accompanying drawings, in which:

Fig. 2 is a vertical, longitudinal section taken on line 2—2 of Fig. 1;

Fig. 3 is a vertical transverse section taken on broken line 3—3 of Fig. 2 showing the mechanism for unloading the second or bottom tier of containers;

Fig. 4 is a view similar to Fig. 3 with certain parts shown in different positions;

Fig. 5 is a similar view showing such parts in still other positions;

Fig. 6 is a projectional view of the unloading mechanism for removing the lower tier of cans, conditions being the same as in Fig. 4;

Fig. 7 is a fragmentary vertical section of a shipping case showing how the flared upper edge of a metal container tends to wear itself into the wall of the case;

Fig. 8 is a view similar to Fig. 7 showing the freeing of the wall from the container by the apparatus of the invention;

Fig. 9 is a view partly in plan and partly in horizontal section of a case with the parts as shown in Figs. 4 and 6;

Fig. 10 is a vertical section of a detail of the lifting head;

Fig. 11 is an air piping diagram;

Fig. 14 is a plan view of the lifting head shown in Fig. 12;

Fig. 17 is an exploded detail view; and

Fig. 18 is a view similar to Fig. 12 showing another modified form of gripper head for handling internally gripped jars.

Figure 1:
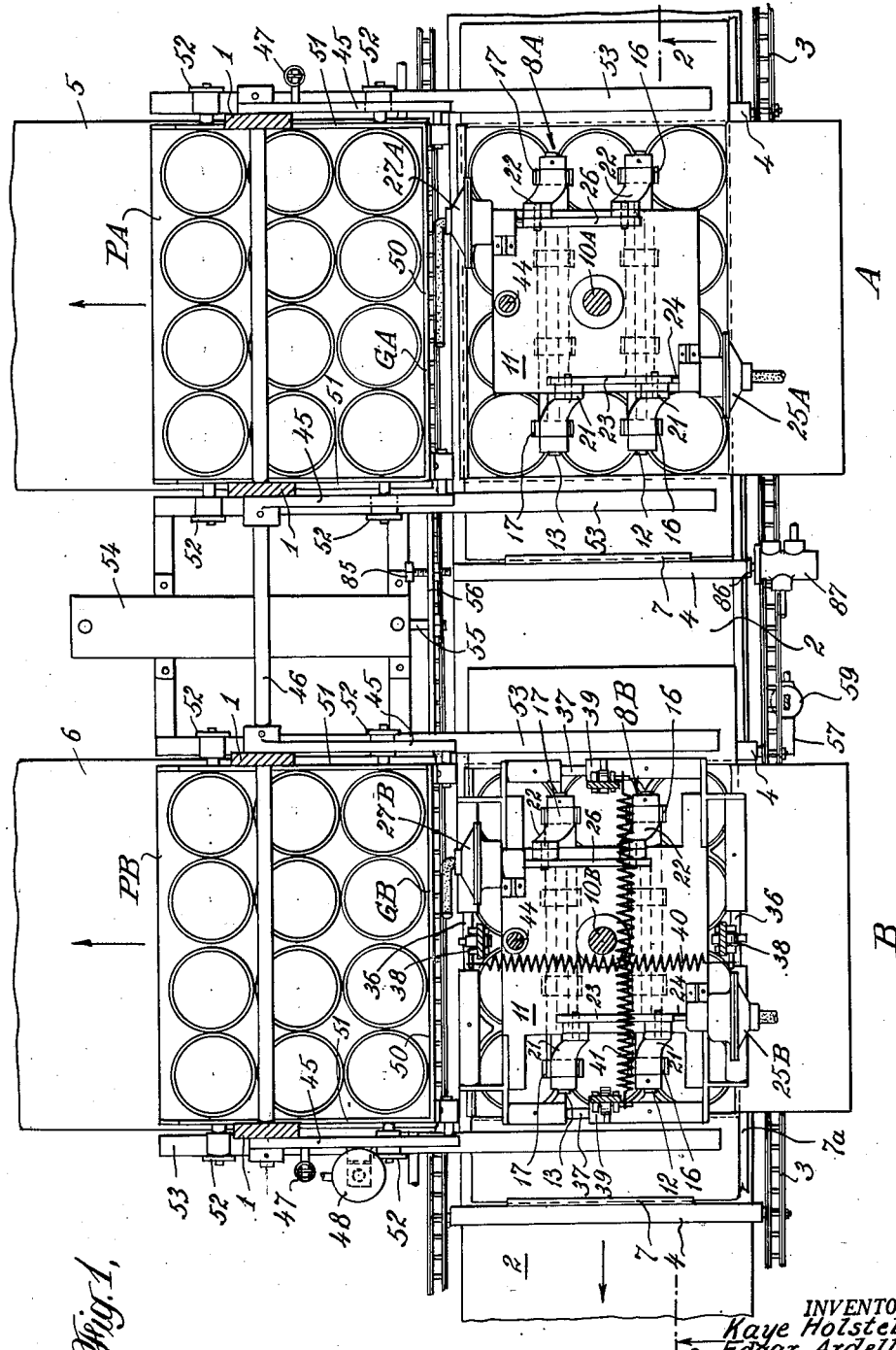
Fig. 1 is a sectional plan view taken on line 1—1 of Fig. 2 of an apparatus which has been devised to simultaneously remove both the upper and lower tiers of cans from a case containing two tiers.

Referring now to the accompanying drawings the machine has the usual frame 1 which supports the various parts including a table or support 2 having a smooth level surface along which the cases are moved by means of a flight conveyor 3. This conveyor comprises a pair of chains between which flight bars 4 are mounted at uniform intervals. Conveyor 3 is advanced intermittently by any convenient form of step-by-step mechanism (not shown).

Thus conveyor 3 advances each shipping case successively to two unloading stations, namely, station A where the upper tier or layer of empty metal cans is removed, and station B where the lower tier is taken out. At unloading station A there is an article off-bearing conveyor 5 for the cans from the upper tier, and at station B a similar article conveyor 6 for the containers of the second tier.

It will be understood that before the cases arrive at unloading station A the top of each case has been fully opened by unfolding the flaps which make up the top. The operator folds the inner or end flap beneath the turned over top edge of an upright sheet metal plate 7 as shown in Fig. 2. The outer or side flap is opened to a position somewhat as shown in Fig. 4, the inside flap being turned to vertical position and held there by one of the case guides 7a which serve to guide the cases as they move along table 2.

At unloading station A there is a lifter head indicated generally by reference numeral 8A to lift the first tier of containers to the level of conveyor 5, and at station B a lifting head 8B to lift the second tier to the level of conveyor 6.

The general operation of the apparatus as a whole will now be referred to briefly:

As conveyor 3 moves the cases successively to stations A and B, lifting head 8A descends, grips and lifts out the upper tier of empty cans. Simultaneously lifting head 8B descends and lifts out the lower tier. As soon as the two tiers are elevated slightly above the tops of the respective cases, two gate members GA and GB (Figs. 1, 2, 3) drop down behind the preceding tiers of cans which are resting on two movable platens or trays PA and PB which are overlying the end portions of the two conveyors 5 and 6 respectively. Substantially simultaneously with the dropping of gates GA and GB the two platens together begin to move inward or to the right in Fig. 3 and stop beneath the respective lifting heads 8A and 8B. The tiers of cans held by these lifting heads are immediately released onto these platens. Then gates GA and GB rise and the platens return to their outward positions overlying the two conveyors 5 and 6, carrying the cans upon them.

The description of the detailed construction of the apparatus will now be resumed.

Lifting head 8A is operated by means of an air cylinder 9A having a piston rod 10A at the lower end of which is secured the frame plate 11 of the lifting head. Similarly lifting head 8B is operated by air cylinder 9B having a piston rod 10B. These two lifting head structures are alike except for certain parts which are added to lifting head 8B to facilitate removal of the lower tier and which will be described later on. A description of one lifter head will serve for both.

Mounted on the lifter head frame 11 are pairs of fluid pressure actuated gripper fingers constructed and arranged to enter the open mouths of the empty cans constituting a tier in the case, and engage and frictionally grip these cans so as to support them and lift them out of the case. The geometrical arrangement of these fingers depends upon the number and arrangement of the cans in the tier. In the present instance each tier comprises three rows of four cans each and the gripping devices are arranged in pairs in two parallel rows. One row is disposed in the vertical plane which is tangent to the center row and one of the outside rows of cans, while the second row of pairs of grippers is in a similar plane which is tangent to the cans of the center row and the opposite outside row.

Accordingly two pivot shafts 12 and 13 are mounted in these respective planes on frame plate 11 of the gripper head, the opposite ends of these shafts projecting beyond each end of this plate (Fig. 2). Below each of these shafts are two parallel gripper supporting bars or members 14 and 15. Gripper spring fingers 16 and 17 are riveted or otherwise secured to the respective bars 14 and 15 to form spaced pairs of fingers below each of the shafts 12 and 13. Spring fingers 16 and 17 have sufficient length to reach the lower tier of articles when the lifter head frame 11 at unloading station B is lowered to a position just above the top of the case, and the lower ends of these fingers are suitably formed to grip the metal cans. As shown they are provided with resilient pads 18 of rubber or similar material for this purpose.

Gripper supporting bars 14 and 15 are respectively provided with lugs 19 and 20 at their opposite ends which extend upwardly to pivotally suspend the respective bars from the extensions of pivot shafts 12 and 13. To actuate bars 14 and 15 to close or open the gripping fingers, bar 15 has an actuating arm 21 which extends upwardly above shaft 12, and bar 14 has a similar actuating arm 22, these arms being disposed near the opposite ends of bars 15 and 14 respectively. Actuating arms 21 for the gripper supporting bars 15 are pivotally connected to an operating bar 23 which in turn is suitably connected to the piston rod 24 of an air operated diaphragm or cylinder 25A. The actuating arms 22 for the other pair of gripper supporting bars 14 are similarly connected to an operating bar 26 which is actuated by a second air diaphragm or cylinder 27A mounted on the opposite side of the lifting head frame 11. When air pressure is supplied simultaneously to air cylinders 25A and 27A the article gripper fingers 16 and 17 are brought together to engage the cans. When this air pressure is released the operating bars 23 and 26 are moved in the opposite directions by suitable compression springs 28 within the respective operating cylinders 25A and 27A and the cans are released.

The interior construction of these air cylinders is shown in Fig. 10. From this figure it will be seen that the fluid pressure entering through the hose connection operates upon a diaphragm 29 connected to piston rod 24, which is connected to one of the operating bars 23.

As will be seen from several of the figures and particularly Fig. 7, the sheet metal containers have their bottoms beaded to the side walls and the top of this wall is flared as shown at 30 leaving a sharp edge which, during transit of the empty containers in the shipping case cuts into the inner surface of the side wall forming a shallow depression 31. All of the containers on the periphery of the bottom tier cut such depressions in the case walls and when an attempt is made to lift out the tier, their flared edges will engage these depressions 31, thus making it difficult to remove the charge from the case.

In order to overcome this difficulty the lifting head 8B at the left hand or second unloading station is provided with a series of movable fingers surrounding the container gripping fingers or devices 16—17. These case expanding fingers, one of which is indicated at 32 in Fig. 8, are arranged so as to be forced outwardly after they enter the case alongside of the gripping fingers so as to expand the walls of the case and free them completely from the cans, moving the depressions 31 away from the sharp flared can edges. The case expanding fingers are preferably of blade-like form and are pivotally mounted on the frame 11 of lifting head 8B.

The general configuration of the series or group of case expanding fingers depends on the shape of the charge or tier of articles. The shape of the individual fingers, that is, whether flat or laterally curved, also depends on the shape of the charge so that for charges which are contained by cases having flat walls the expanding fingers are substantially flat. In any case however, the lower ends of these fingers are tapered or pointed and are turned or bent inwardly as shown at 33 so as to enter between adjacent cans and provide a sloping or curving outer surface to facilitate the entry of the fingers into the case. The fingers are of substantial width so as to extend slightly beyond the centers of adjacent cans in order to force the case wall away from the tangent points of the cans. The expanding fingers at the sides of the charge are indicated at 32; those at the ends of the case at 34 and 35. Where there is an odd number of rows in the tier or charge, one finger at each end, such as finger 35, is made about half width and functions to separated only a single can from the wall instead of two cans.

Case expanding fingers 32 at the sides of the lifting head are fixed to actuating shafts 36 which are pivoted on the lifting head frame, while the end fingers 34 and 35 are fixed to similarly pivoted shafts 37. Rocking motion is imparted to these respective shafts by means of actuating arms 38 and 39 respectively. Fingers 32 are biased outward to their case expanding position by means of a tension spring 40 which is connected at its opposite ends to the two actuating arms 38. The end fingers 34, 35 are biased outward in a similar manner by means of a tension spring 41 which interconnects the two actuating arms 39.

In order to hold the side expanding fingers 32 in their contracted or inward positions as shown in Fig. 3 during the downward movement of the lifting head two parallel rails 42 are mounted on a stationary support at the lower end of air cylinder 9B. Rollers on the upper ends of actuating arms 38 engage the outer surfaces of rails 42 and thus are held in outward position against the tension of spring 41. A similar pair of stationary rails 43 is provided to engage rollers on actuating arms 39.

These four rails extend downward a sufficient distance to maintain the fingers 32 and 34, 35 in contracted position until after their lower ends have passed below the top of the case. At this point rails 42 and 43 terminate, being curved inwardly at their lower ends so as to prevent a too abrupt expansion movement of fingers 32 and 34, 35, and also to facilitate the re-engagement of the actuating arms 38 and 39 with these rails on the upward stroke of the lifting head.

In order to prevent the lifting heads 8A and 8B from turning on the piston rod axes and swinging out of line with the shipping cases a guide rod 44 is secured to each lifting head and arranged to slide in a guiding aperture in the frame bracket which supports each of the respective air cylinders 9A and 9B.

Each gate member GA and GB is a rigid plate and is supported at each end by means of a pair of parallelogram linkage arms 45. These arms are pivoted to the gate members at their right ends as viewed in Figs. 3–6. The left ends of the lower arms 45 are pivoted to frame 1 in any suitable way. The left ends of the upper arms 45 are pinned to a common actuating rock shaft 46. (Figs. 1 and 2.)

Gate members GA and GB are lifted to their "up" position as shown in Fig. 3 by means of two tension springs 47, and the gates are moved down simultaneously by means of a single fluid pressure cylinder 48 against the action of these springs. For this purpose the piston rod 49 of this air cylinder is connected to the upper arm 45 at the left of gate GB.

Platens PA and PB are of similar construction. Each consists of a flat tray preferably of sheet metal having a frame 50 at the back which prevents the charge of cans from sliding off the platen as it moves toward the left after receiving the cans from the lifting head. Each platen also has flanges 51 on each side. The platens are each provided with flanged wheels 52 which roll on pairs of rails 53 arranged at each unloading station A and B. The two platens PA and PB are moved back and forth simultaneously by means of a fluid pressure cylinder 54 which has a piston rod 55 fixed at its end to a common driving bar 56 extending between the front ends of the platens.

Figure 6:
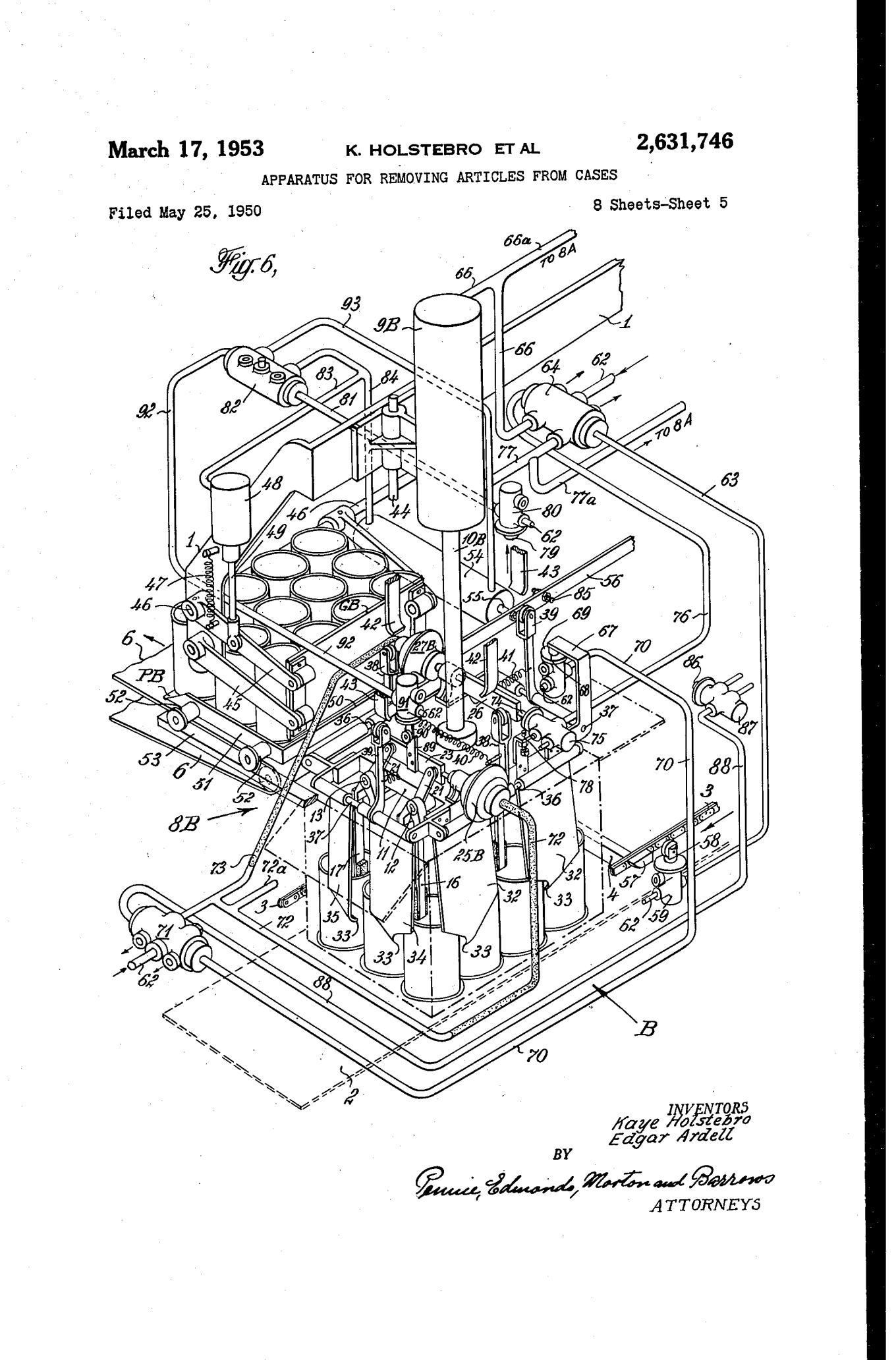

A feature of this invention which contributes substantially to the reliability of operation, low maintenance expense and low first cost is the sequence of operation of the unloading mechanism together with the fact that each movement or step in the sequence is initiated by the preceding movement and substantially at its completion. The mechanism by which this is accomplished is shown in Figs. 6 and 11.

At the completion of the movement of the cases to the respective unloading positions A and B, a block cam 57, which is mounted on one of the conveyor chains 3 adjacent the end of each flight bar 4, momentarily engages an actuating member 58 of a pilot valve 59. This momentarily depresses the valve member 60 which is returned to its upper position as shown in Fig. 11 by means of a compression spring 61 as soon as the rear end of cam 57 releases the roller at the top of actuating member 58.

This causes pressure fluid such as air under suitable pressure from a supply line 62 to pass through a pipe 63 to the upper end of a 2-position spool valve 64. This displaces valve member 65 to the position shown in Fig. 11 where it remains. In this way air from supply line 62 is conducted to the upper end of said cylinder 9B through a pipe 66. A branch pipe 66a conveys air to air cylinder 9A for station A. Thus both of the lifting heads 8A and 8B are moved down simultaneously to cause the gripper fingers of lifter head 8A to enter the containers of an upper tier, and the gripper fingers of lifter head 8B to enter the containers of a lower tier.

Substantially at the end of the downward movement of these lifting heads, an angle shaped part 67 on lifting head 8B (Fig. 6) engages the actuating member 68 of a pilot valve 69 which controls the air supply to the gripper finger actuating mechanisms. It will be understood that the construction of this pilot valve and also the two other pilot valves yet to be referred to is identical with that of pilot valve 59 as shown in detail in Fig. 11. Accordingly the depression of actuating member 68 causes air pressure from line 62 to pass through pipe 70 to the upper end of a second spool valve 71. The construction of this valve, and the others to be referred to, is similar to spool valve 64, and this air pressure causes the valve member of valve 71 to be displaced in such a way as to connect the diaphragms 25B and 27B, for actuating the gripper fingers, with the air supply 62 through pipes 72 and 73 respectively. A branch pipe 72A conveys the same air pressure to the diaphragms 25A and 27A of the lifting head at station A.

Hence the gripping mechanisms of both lifting heads 8A and 8B are simultaneously actuated to cause fingers 16 and 17 on the two heads to grip respectively the upper and lower tiers of cans at the two stations.

Substantially at the end of the gripping stroke of one of the operating bars 26 actuating by diaphragm 27B, the end of this bar engages an actuating member 74 of a pilot valve 75 and this places the air pressure from line 62 in communication with the left hand end of spool valve 64 (Fig. 6) through pipe 76. Valve member 65 is thereby returned to its original position at the right end of the valve (upper end in Fig. 11). Pipes 66 and 66A from air cylinders 9B and 9A are thus placed in communication with the atmosphere through an opening in spool valve 64, and air pressure from line 62, at the same time, is applied through pipes 77 and 77A to the opposite ends of these cylinders. The lifting heads 9B and 9A are raised to their upper positions lifting the respective tiers of cans out of the two cases.

At substantially the end of the upward movement, an actuating screw 78 which is mounted on lifting head 8B contacts the actuating member 79 of a third pilot valve 80. This places air from line 62 in communication with the right end of a third spool valve 82 (Fig. 6) through a pipe 81. The valve member of this valve is thus moved toward the left applying air pressure from line 62 through pipe 83 to air cylinder 48, which drops the two gates GB and GA. Simultaneously the air pressure is conducted through pipe 84 to the left end of air cylinder 54 which begins to move the two platens PA and PB inward or toward the right beneath the two tiers of cans suspended beneath two lifting heads.

The arrangement of the gate operating mechanisms is such that the gates drop almost instantly so that the tiers of cans which are already on platens PA and PB are prevented by the gates from moving with the platens, so that these cans move off of the left edges of the platens onto the respective article conveyors 5 and 6.

At substantially the end of this inward movement of the platens, an actuating screw 85, which is mounted on the common driving bar 56 between the two platens, engages actuating member 86 of a third pilot valve 87, and air passes through pipe 88 to the left end of spool valve 71 (Fig. 6). This connects pipes 72, 72A and 73 to exhaust, and the springs within the respective diaphragm 25A and B and 27A and B reverse the can gripping fingers 16 and 17 of both lifting heads 8B and 8A, releasing the cans onto the respective platens therebeneath.

In order that the cans may not be deflected as they drop by contact with fingers 32 and 34, which might cause upsetting of some cans, the four stationary rails 42 and 43 are offset inwardly at their upper end portions (Figs. 2-5) so as to allow fingers 32 and 34 to return to their outer or expanded positions (see Fig. 5).

The movement of one of the operating bars 23 to release the gripper fingers causes a cam 89 mounted on this bar to engage a roller on the actuating member 90 of a fourth pilot valve 91. In this way air under pressure passes through a pipe 92 to the left end of spool valve 82 (Fig. 6). The movement of valve 82 exhausts pipes 83 and 84 and directs air pressure through pipe 93 to the opposite end of air cylinder 54. Gates GA and GB immediately rise and platens PA and PB move the tiers of cans from beneath the lifting heads 8A and 8B and return them over the two conveyors 5 and 6.

The sequence of movements carried out by this apparatus and especially including the fact that each separate movement is initiated by and substantially at the completion of the preceding movement has been found especially effective in connection with the construction and operation of unloading apparatus.

Referring now to Figs. 12-16 the lifting head here illustrated is, generally speaking, not unlike the lifting head previously described but is modified in its details and is arranged to grip the articles, namely, beverage bottles externally, and it is capable of handling filled bottles as well as empty ones. It will be understood that the lifting head shown in these figures, as well as the further modification shown in Fig. 18, can be substituted in place of the lifting head previously described. The lifting head frame 94 for the form shown in Figs. 12-16, as well as the frame 94a for the form shown in Fig. 18, may be fixed, for example, to the lower end of the piston rod 10A of the unloading apparatus previously described.

Figure 12:
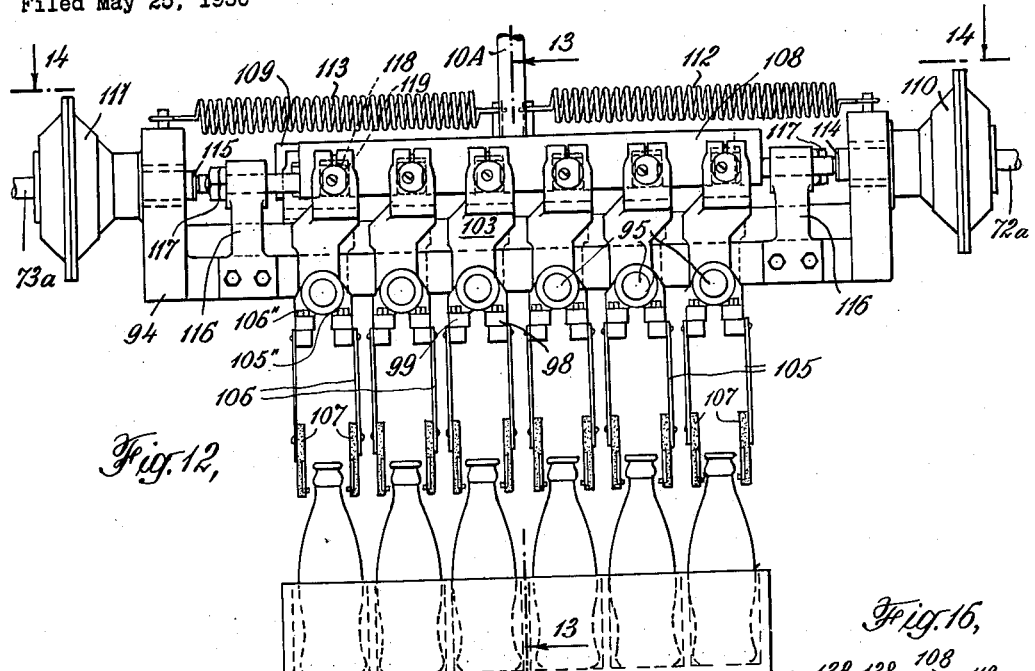
Fig. 12 is a side elevation of a modified form of lifting head for lifting externally gripped articles such as Coca Cola bottles.
Figures 13, 15, 16:
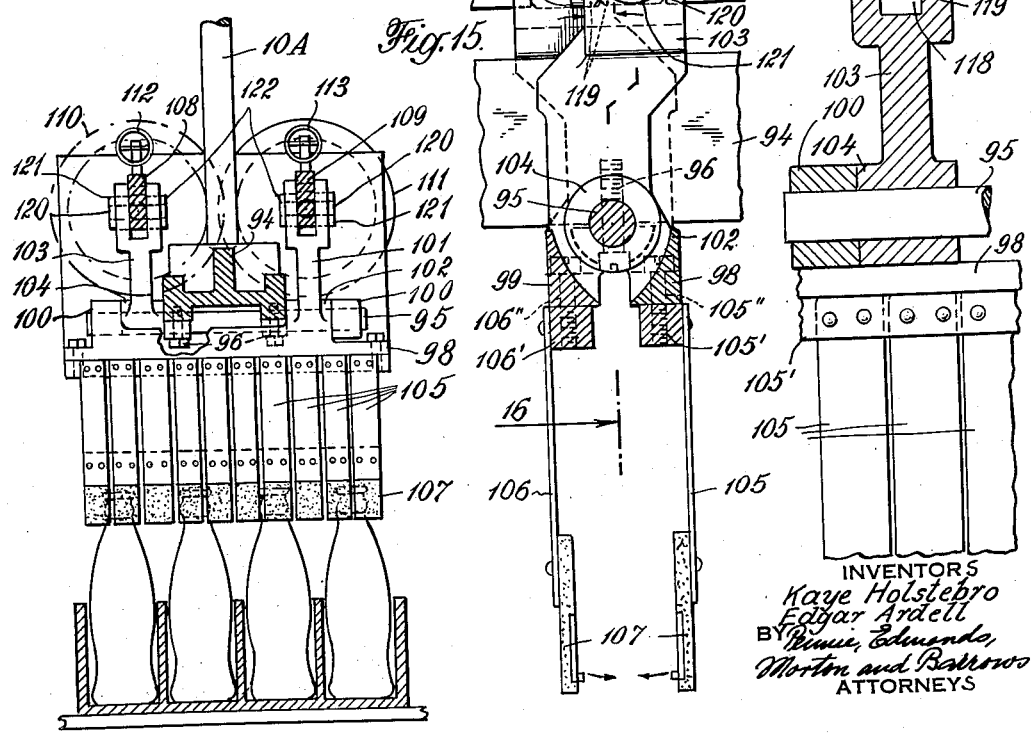
Fig. 13 is a vertical transverse section taken on line 13—13 of Fig. 12.
Fig. 15 is an enlarged vertical section showing details of a gripping unit for a single row of bottles.
Fig. 16 is a partial vertical section taken on line 16—16 of Fig. 15.

As shown in Figs. 12, 13 and 14, frame member 94, preferably in the form of a casting, has an elongated central ripped portion which terminates in two upstanding cross members for supporting the two pressure fluid actuating cylinders or diaphragms. A series of spaced parallel pivot shafts 95 is arranged beneath the central section of frame 94. These shafts are each fixed to the frame by means of two screws 96 (Fig. 13) which pass through apertures 97 (Fig. 17) and are received in tapped holes in the frame.

The number and spacing of these shafts depends upon the number of rows and the size of the bottles or other articles to be handled. In the present instance the lifting head is arranged to unload Coca Cola bottles from trays containing six rows of four bottles each. Consequently there are six of these shafts 95. The shafts are long enough to accommodate the four bottles of each row as shown in Fig. 13 and are spaced apart as shown in Fig. 12 appropriately to place one shaft directly above each row.

Below each of the shafts 95 are two parallel gripper supporting members 98 and 99 forming a pair. For convenience in manufacture these members are exactly alike, each having at one end a bearing lug 100 and, near the opposite end, a combined actuating arm and second bearing lug which is constructed as a hub for this arm. For convenience of description, gripper supporting member 98 has an actuating arm 101 and a bearing hub 102 (see Figs. 13, 15 and 16), while gripper member 99 has a similar actuating arm 103 and bearing hub 104. Supported by member 98 are a series of spring fingers 105, and supported by member 99 a similar series 106. These fingers, however, instead of being secured directly to these supporting members as in the previously described construction, are riveted respectively to bars 105' and 106' and these bars are in turn removably attached to the respective supporting members 98 and 99 by means of screws 105" and 106". With this construction it is a simple matter to change over the apparatus to handle different kinds of articles by replacing the spring fingers 105 and 106 with a set of different length or otherwise in arrangement.

As shown in Fig. 13 these gripper fingers are preferably arranged close to one another along their respective bars 105' and 106', so as to form substantially continuous rows of gripper fingers. If preferred, however, the gripper fingers may be arranged in spaced pairs 105, 106, corresponding with the spacing of the bottles in each cross row of four. These gripper fingers are preferably tipped with friction material such as rubber or the like as indicated at 107 suitably shaped to engage the tops of the articles, in this case the necks of the Coca Cola bottles.

It will be understood that to actuate the gripper fingers 105 and 106 to grip or release the bottles, actuating arms 101 and 103 are rocked in opposite directions (Figs. 12 and 15). The series of actuating arms 101 are moved by means of an operating bar 108 at the front of the lifting head as shown in Fig. 14, while the series of actuating arms 103 at the rear are moved by a similar operating bar 109. The fluid pressure diaphragm or cylinder 110 at the right operates front operating bar 108 and diaphragm 111 at the left, the rear operating bar 109.

The arrangement is such that when the air pressure is applied to these two diaphragms simultaneously gripper fingers 105 and 106 are moved toward one another to grip the bottles. This movement tensions two springs 112 and 113 respectively connected at the inner ends to operating bars 108 and 109, and at their outer ends to frame 94. These springs move fingers 105 and 106 in the opposite direction to release the bottles when the air pressure in diaphragms 110 and 111 is removed. It will be understood that these diaphragms may be connected with a suitable source of air pressure such as shown at 62 in Fig. 11 by the valve mechanism shown in that figure, or otherwise, the diaphragms being connected to the air control system by means of air pipes 72a and 73a respectively.

In order to move operating bars 108 and 109 the piston rods 114 and 115 of the respective diaphragms engage the right and left hand ends respectively of these operating bars. Each of these bars consists of a rectangular central section for operative connection with the several operating fingers as is about to be described, and of two rod-like end sections arranged to slide in supporting brackets 116 which are fixed to the lifting head frame 94. The left rod-like end section of operating bar 108 is threaded and the right end section of bar 109 is simultaneously threaded to receive stop nuts 117. These nuts, engaging their adjacent brackets 116, limit the movement of the respective operating bars under the action of their tension springs 112 and 113.

The operative connections between the upper ends of actuating fingers 103 and the front operating bar 108, and also the connections between actuating arms 101 and rear operating bar 109 are such as to provide for the adjustment of the angular positions of the individual gripper supporting bars 98 and 99 on the several pivot shafts 95 for the purpose of adjusting the several sets of gripping fingers 105 and 106 respectively so that the row of bottles will be properly centered between them, and also for the purpose of adjusting the gripping pressure on the bottles of each row as desired. This is accomplished by employing eccentric bushings at each pivotal connection, to be presently described.

Each of the operating bars 108 and 109 is provided with a series of equally spaced substantially square open notches 118 (Figs. 12 and 16) which extend upward from the bottom of the rectangular central sections of these bars. These notches are spaced apart substantially the same distance as the spacing of pivot shafts 95. In each of these notches there is fitted a block 119 which is apertured centrally to receive a pivot pin 120. Blocks 119 are arranged to slide vertically in their respective notches during the gripping or releasing movements of the several parts.

The outer ends of each of the pins 120 is received in one of the eccentric bushings referred to, namely, an outer eccentric bushing 121 and an inner eccentric bushing 122. The upper end of each of the actuating arms 103 and 101 is forked, the front section of the fork being indicated at 123 and the rear section at 124. Eccentric bushing 121 fits in a circular opening in front section 123 of the fork and eccentric bushing 122 in a similar opening in rear fork section 124. The operating bars 108 and 109 are received between these forked sections of the operating arms.

The adjustment of an individual actuating arm with respect to its operating bar is made by rotating the eccentric bushings 121 and 122, which shifts the center of pin 120 lengthwise of the operating bar. This rotative movement is accomplished by placing a wrench on the slabbed surfaces 125 which are provided on each of the outer bushings. To rotate the inner bushing 122 it is pinned at 126 to the pivot pin 120 and a screw driver slot 127 is provided in the outer end of this pin.

It is necessary to fix the two eccentric bushings 121 and 122 against further rotative movement after the adjustment has been made and for this purpose each of the forked sections 123 and 124 of the actuating arm is split by means of a central saw cut as shown in Fig. 15, and clamping screws 128 (Figs. 12 and 16) provide means for drawing these split sections together to clamp the respective eccentric bushings.

The further modified form of lifting head shown in Fig. 18 is of the same general construction as described in connection with Figs. 14–17 except for the provision of tips 129 on the lower ends of the article engaging spring fingers so as to handle open mouth jars, or the like, by internal gripping instead of external. All of the parts in common with the previously described lifting head are indicated by the same reference number accompanied by the subscript $a$.

Since internal gripping fingers are actuated in the reverse direction from external and since it is desired to actuate the fingers to gripping position by means of the air pressure, the positions of the two operating diaphragms are reversed. That is to say, diaphragm 110a for the front operating bar 108a is mounted at the left on lifting head frame 94a, and diaphragm 11a for the rear operating bar 109a is placed at the right. Compression springs 130 and 130' are employed to move the operating bars in the reverse direction, instead of tension springs 112 and 113.

Spring 130 is mounted on the rod-like end portion 131 of operating bar 108a which portion is somewhat longer than in the case of bar 108 and compression spring 130 is mounted on this rod-like portion, one end engaging the adjacent bracket 116a and its opposite end engaging a pair of nuts 132 which may be adjusted to give the desired spring pressure. Piston rod 114a of diaphragm 110a engages the end of rod-like portion 131 to move operating bar 108a toward the right. To limit the leftward movement of bar 108a under the action of spring 103 a collar 133 is pinned adjacent the end of the rod-like end portion 134 of bar 109a which in this instance is not threaded.

It will be understood that the construction and operation of the rear operating bar 109a is similar to that just described, the threaded rod-like right end portion of this operating bar being indicated at 135 and being engaged by piston rod 115a of diaphragm 111a.

It will be understood that changes may be made in the construction and operation of the apparatus described above without departing from the spirit of the invention and that the scope of the invention is set forth in the appended claims.

We claim:

1. In apparatus for removing articles from cases, a lifting head comprising a group of article-gripping devices constructed and arranged to enter a case and releasably engage and support a tier of articles therein, a series of case-expanding fingers surrounding said gripping devices, said fingers being movably mounted on said lifting head and arranged to engage the inner surfaces of the walls of the case when the lifting head is within the case, means for projecting the lifting head into the case, and means operative after entrance of the end portions of said fingers within the case to force said fingers outwardly thus expanding the case walls to free them from the contacting articles of said tier.

2. Apparatus as set forth in claim 1 in which the case-expanding fingers are blade-like in form having their outer ends pointed and turned laterally inward to enter between adjacent articles of the tier.

3. Apparatus as set forth in claim 2 in which the case-expanding fingers are pivotally mounted on the lifting head.

4. In apparatus for removing articles from cases, a lifting head comprising a group of article-gripping devices constructed and arranged to enter a case and releasably engage and support a tier of articles therein, a row of case-expanding fingers pivotally mounted on said lifting head along each side of said gripping devices and arranged to engage the inner surfaces of the side walls of the case when the lifting head is within the case, a row of similar fingers pivotally mounted on said lifting head at each end of said gripping devices, means for projecting the lifting head into the case, spring means for biasing said fingers outward, an actuating arm for each of said rows of fingers, a stationary rail cooperating with each of said arms as the lifting head moves towards the case to maintain said fingers contracted adjacent said lifting devices, said rails terminating to release said arms after they have entered the case.

5. Apparatus as set forth in claim 4 in which the pivoted fingers are blade-like in form having their outer ends pointed and turned laterally inward to enter between adjacent articles of the tier.

6. In apparatus for removing articles from cases, a lifting head comprising a group of article-gripping devices constructed and arranged to releasably engage and support a tier of articles within a case, a series of case-expanding fingers surrounding said gripping devices, said fingers being movably mounted on said lifting head and arranged to engage the inner surfaces of the walls of the case when the lifting head is within the case, means for bringing the case and lifting head together with the lifting head within the case to engage the articles therein, means operative after entrance of the end portions of said fingers within the case to force said fingers outwardly thus expanding the case walls to free them from the contacting articles of said tier, and means for separating said lifting head and case, said fingers sliding on the interior surfaces of the case walls during the movement of separation to maintain said walls free from the articles.

7. Apparatus as set forth in claim 6 in which the case-expanding fingers are blade-like in form having their outer ends pointed and turned laterally inward to enter between adjacent articles of the tier.

8. Apparatus as set forth in claim 6 in which the case-expanding fingers are pivotally mounted on the lifting head.

KAYE HOLSTEBRO.
EDGAR ARDELL.

REFERENCES CITED

The following references are of record in the file of this patent:

UNITED STATES PATENTS

| Number | Name | Date |
|---|---|---|
| 1,898,393 | Rickers | Feb. 21, 1933 |
| 2,253,283 | Minaker | Aug. 19, 1941 |
| 2,390,242 | Engler | Dec. 4, 1945 |
| 2,466,693 | Fisher | Apr. 12, 1949 |